United States Patent

Kato et al.

[11] Patent Number: 5,905,704
[45] Date of Patent: May 18, 1999

[54] DATA REPRODUCING APPARATUS FOR REPRODUCING DATA FROM SECTOR UNITS OF A RECORDING MEDIUM

[75] Inventors: Satoshi Kato, Hirakata; Akira Muto, Sakai, both of Japan

[73] Assignee: Matsushita Electric Industrial Co., Ltd., Osaka-fu, Japan

[21] Appl. No.: 08/751,890

[22] Filed: Nov. 18, 1996

Related U.S. Application Data

[62] Division of application No. 08/313,439, Sep. 27, 1994, Pat. No. 5,623,467.

[30] Foreign Application Priority Data

Sep. 27, 1993 [JP] Japan ................................. 5-239699
Sep. 27, 1993 [JP] Japan ................................. 5-239700

[51] Int. Cl.⁶ .................................................... G11B 7/00
[52] U.S. Cl. ............................. 369/48; 369/47; 369/58
[58] Field of Search ............................ 369/47, 48, 50, 369/54, 58, 59, 124, 44.26; 360/48

[56] References Cited

U.S. PATENT DOCUMENTS

| | | |
|---|---|---|
| 4,418,368 | 11/1983 | Nalley et al. . |
| 4,523,304 | 6/1985 | Satoh et al. ................................. 369/32 |
| 4,734,901 | 3/1988 | Murakami . |
| 4,805,046 | 2/1989 | Kuroki et al. . |
| 4,855,983 | 8/1989 | Arai . |
| 4,908,811 | 3/1990 | Yokogawa et al. . |
| 4,947,367 | 8/1990 | Chang et al. . |
| 5,034,939 | 7/1991 | Kurz et al. . |
| 5,054,017 | 10/1991 | Hiroyoshi et al. ......................... 369/47 |
| 5,119,291 | 6/1992 | Flannagan et al. . |
| 5,153,861 | 10/1992 | Maeda et al. . |
| 5,359,584 | 10/1994 | Fukushima et al. . |

FOREIGN PATENT DOCUMENTS

| | | |
|---|---|---|
| 63-13171 | 1/1988 | Japan . |
| 63-13172 | 1/1988 | Japan . |
| 1-154382 | 6/1989 | Japan . |
| 3-71244 | 3/1991 | Japan . |
| 5-225709 | 9/1993 | Japan . |

*Primary Examiner*—Thang V. Tran
*Attorney, Agent, or Firm*—Ratner & Prestia

[57] ABSTRACT

When data is recorded to a recording medium having a sector structure, the data is recorded with synchronization signals (frame marks) placed at a constant interval for use during data reproduction. When the data is then reproduced from this recording medium, these frame marks are detected to demodulate the data based on the detected signals.

8 Claims, 14 Drawing Sheets

Sector format

DATA REPRODUCING APPARATUS FOR REPRODUCING DATA FROM SECTOR UNITS OF A RECORDING MEDIUM

This application is a division of application Ser. No. 08/313,439, filed Sep. 27,1994, now U.S. Pat. No. 5,623,467.

TITLE OF THE INVENTION

Data recording apparatus and data reproducing apparatus

BACKGROUND OF THE INVENTION

1. Field of the Invention

The present invention relates to a data recording apparatus and a data reproducing apparatus for respectively recording and reproducing data to and from a recording medium having a sector structure.

2. Description of the Prior Art

When digital signals are recorded to a recording medium such as an optical disk or magnetic disk, the recording tracks are generally divided into plural sectors, and the data is recorded and reproduced by sector unit.

Specifications related to the data disk are regulated, for instance, by ISO/IEC DIS 10090. FIG. 12 shows a block diagram of the conventional reproducing apparatus according to the above regulation and FIGS. 13 and 14 show the sector format and the data format according thereto, respectively.

Each sector includes an ID section and a data section. Each data section contains a resynchronization (RS) mark every 15 bytes, but there are no RS marks or equivalent marks written to the ID section.

A data reproducing apparatus for reproducing signals recorded with this conventional format generally uses a reproducing method as described below. Specifically, the synchronization marks (SB1, SB2, SB3; referred to as "SYNC" hereinbelow) indicating the beginning of the data unit and the RS marks are detected by SYNC detection circuit 41 and RS detection circuit 42, respectively, and the data is read by synchronizing to these detected signals. Some means of interpolation must also be applied when the signals required for synchronization are not correctly detected, however, because the data cannot be reliably read without accurate synchronization. These interpolation methods have typically interpolated the needed synchronization marks based on a previously detected normal signal to output the expected signal at the point where it should have been detected. For example, a missed RS mark is interpolated from the previous RS mark by RS substitution signal generator 44, and SYNC mark is interpolated from the SM detection signal, the detected SYNC signal of the previous sector, or the final RS mark in the data unit of the previous sector by SYNC substitution signal generator 43.

However, when there is a significant time lag between the previously detected signal and the interpolated signal, implementing the above method necessitates a trade-off between the use of large-scale, complex circuitry or a drop in data reliability.

SUMMARY OF THE INVENTION

Therefore, an object of the present invention is to provide a data recording apparatus for recording with a sector structure whereby interpolation is simple and reliability is improved when a synchronization signal detection error occurs during data demodulation by missing SYNC, RS, or similar marks; and to provide a data reproducing apparatus comprising a means for detecting or interpolating such signals as the synchronization signal to achieve high reliability data reproduction.

A data recording apparatus achieving the above object according to the present invention comprises a data recording apparatus for recording data to a recording medium in sector units, and comprising an ID section generation means for generating an ID section in frame units which contains information for identifying a physical position of each sector on the recording medium a data section generation means for generating a data section in frame units which contains input data to be recorded in said each sector as digital data a sector formation means for synthesizing the ID section and data section generated by said ID section generation means and data section generation means to form a sector and a frame mark means for arranging a frame mark at a head position of each frame. This data recording apparatus is characterized by always placing the frame marks at a constant interval.

A data reproducing apparatus achieving the above object according to the present invention comprises information reproducing apparatus for obtaining a reproduction signal from information recorded on a recording medium formatted in sector units comprising a reproduction processor for reading out the information recorded on the recording medium and outputting the information as a reproduction signal after amplifying it a clock signal generator for generating clock signals in synchronization with the reproduction signal a frame mark detection means for detecting frame marks from the reproduction signal, said each frame mark having a specific pattern distinguishable from other patterns contained in the reproduction signal and a demodulation means for demodulating the reproduction signal based on the detected frame marks. This data reproducing apparatus is characterized by synchronizing to the frame marks to achieve high reliability reproduction of the data by frame units.

By means of the data recording and reproducing apparatuses thus comprised, the frame marks are recorded at a known constant interval and therefore exist at a known constant cycle during data reproduction. As a result, if the frame mark detection signal is not normally detected for any reason during data reproduction, or if the frame mark is detected at some position other than the expected position, interpolation of the missing frame mark or elimination of the extraneous frame mark can be accomplished by means of extremely simple circuitry, and the circuit scale can be reduced. High reliability data reproducing is also made possible.

BRIEF DESCRIPTION OF THE DRAWINGS

The present invention will become more fully understood from the detailed description given below and the accompanying diagrams wherein.

DESCRIPTION OF PREFERED EMBODIMENTS

The preferred embodiments of data recording apparatuses and data reproducing apparatuses according to the present invention are described below with reference to the accompanying drawings.

Figure 1:
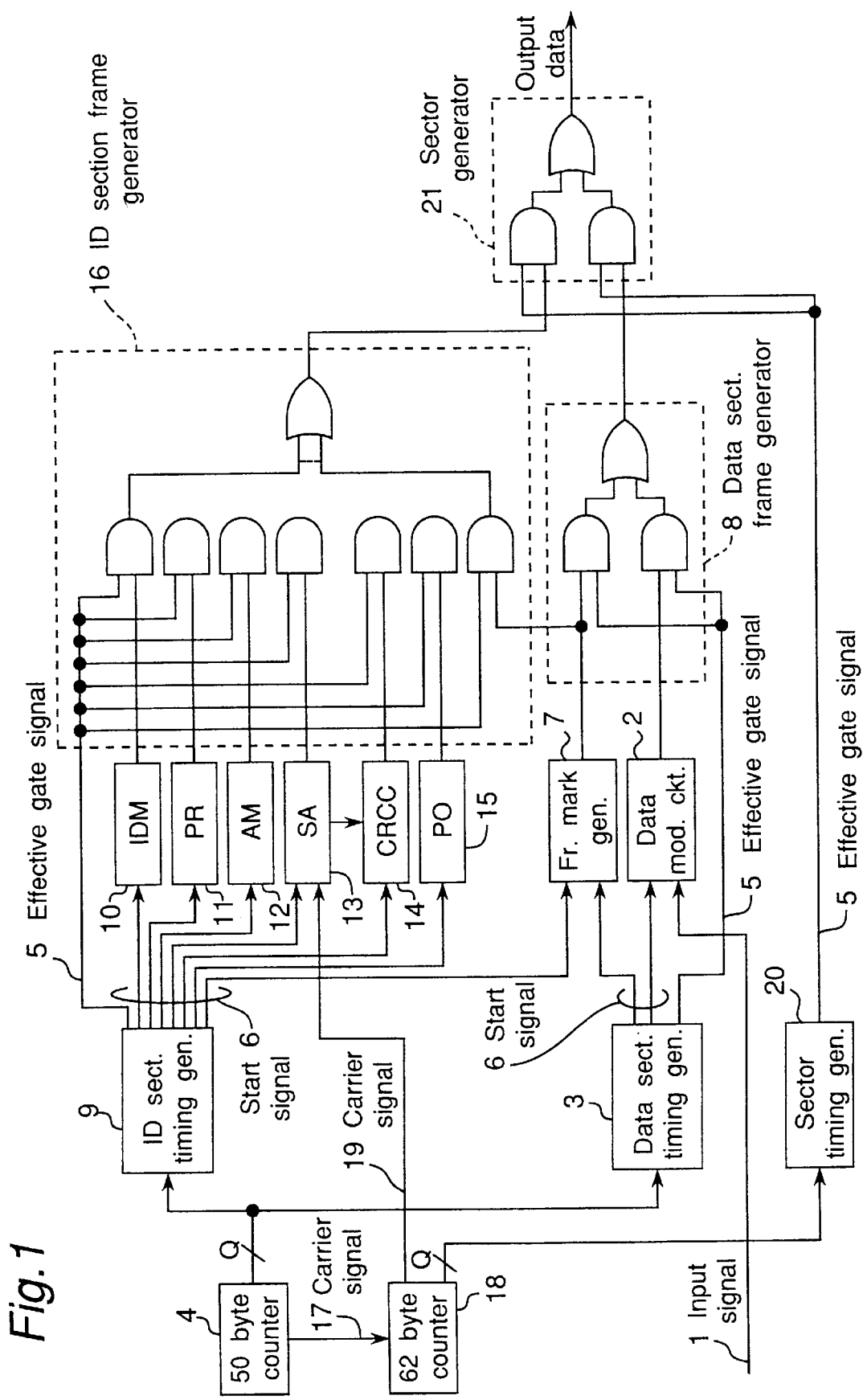
FIG. 1 is a block diagram of a data recording apparatus according to the first embodiment of the present invention.

A data recording apparatus according to the first embodiment of the invention is described first below with reference to FIG. 1, a block diagram of the apparatus, and FIGS. 2 and 3, diagrams of the sector format, ID section format, and data section format, respectively, recorded by the apparatus shown in FIG. 1.

The method of generating the data unit is described first. An input signal 1 is first input to a data modulation circuit 2, which modulates the input signal. An output of a base-50 byte counter 4 is input to a data unit timing generator 3, which simultaneously generates an effective gate signal 5 between a frame mark and data in a data unit frame, and a start signal 6 is output to a frame mark generator 7 and the data modulation circuit 2. The frame mark generator 7 and data modulation circuit 2 serially output frame marks and modulated data, respectively. A data unit frame generator 8 multiplexes the outputs from the frame mark generator 7 and data modulation circuit 2 using an effective gate signal 5 applied from the data unit timing generator 3 to generate the data unit frame.

The method of generating an ID section is described next. As shown in (B) of FIG. 2, each frame (frames 1 and 2) of the ID unit comprises an ID mark ("IDM" below), preamble ("PR"), address mark ("AM"), sector address ("SA"), error checking code ("CRCC"), and postamble ("PO"). Similarly to the method described above for data section generation, the output of the base-50 byte counter 4 is input to an ID unit timing generator 9, which simultaneously generates an effective gate signal 5 for the component elements of the ID section in an ID unit frame, and the start signals 6 output to the generating circuits for each of these same component elements. IDM generator 10, PR generator 11, AM generator 12, SA generator 13, CRCC generator 14, and PO generator 15 serially output the generated data according to the start signals 6 input thereto. The ID unit frame generator 16 then multiplexes these ID unit components using an effective gate signal 5 output from an ID unit timing generator 9 to generate the ID unit frame.

Note that the same modulation applied to the data unit can also be applied to all component elements of the ID unit other than the frame marks during the ID unit frame generation process.

The SA generator 13 increments the sector address at the carrier signal 19 output from the base-62 frame counter 18, which counts up at the carrier signal 17 input from the base-50 byte counter 4, and thus increments the sector address each sector. The SA generator 13 also outputs an sector address to the CRCC generator 14, which reads the new sector address to generate the CRCC each time the sector address is incremented.

The method of generating the sector is described next. A sector timing generator 20 also operates on the output from the base-62 frame counter 18 to generate the effective gate signal 5 of the ID section and data section in each sector. The sector generator 21 then multiplexes the outputs from the ID unit frame generator 16 and the data unit frame generator 8 using the effective gate signal 5 supplied by the sector timing generator 20 to generate a sector.

Figure 2A:
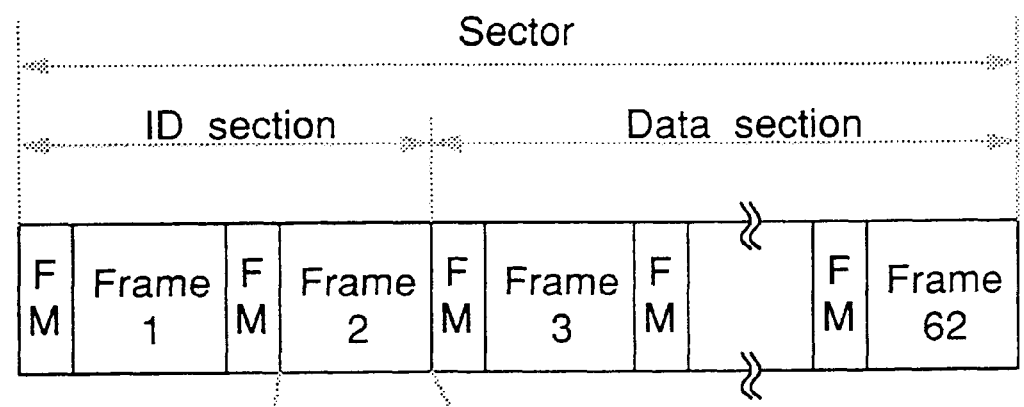
FIG. 2 is a sector format employed in a data recording apparatus according to the first embodiment of the present invention.
Figure 2B:
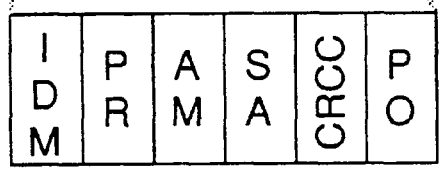

As a result, each recorded sector comprises 62 frames, including two frames in the ID section and sixty frames in the data section, as shown in (A) of FIG. 2, with frame marks placed at a constant known spacing throughout each sector. The reliability of ID section reading is also increased by writing the ID section data twice to separate frames.

It is to be noted that the ID section must only be written once, but can be written two or more times for increased reliability.

The IDM is used to separate the ID section and the data section, and to mark the beginning of the ID section. The PR and PO are repeated patterns of the same number of consecutive zeros and ones, respectively. The AM is provided before the sector address to indicate that the sector address follows. The CRCC is a code used to detect bit errors in the sector address.

Figure 3:
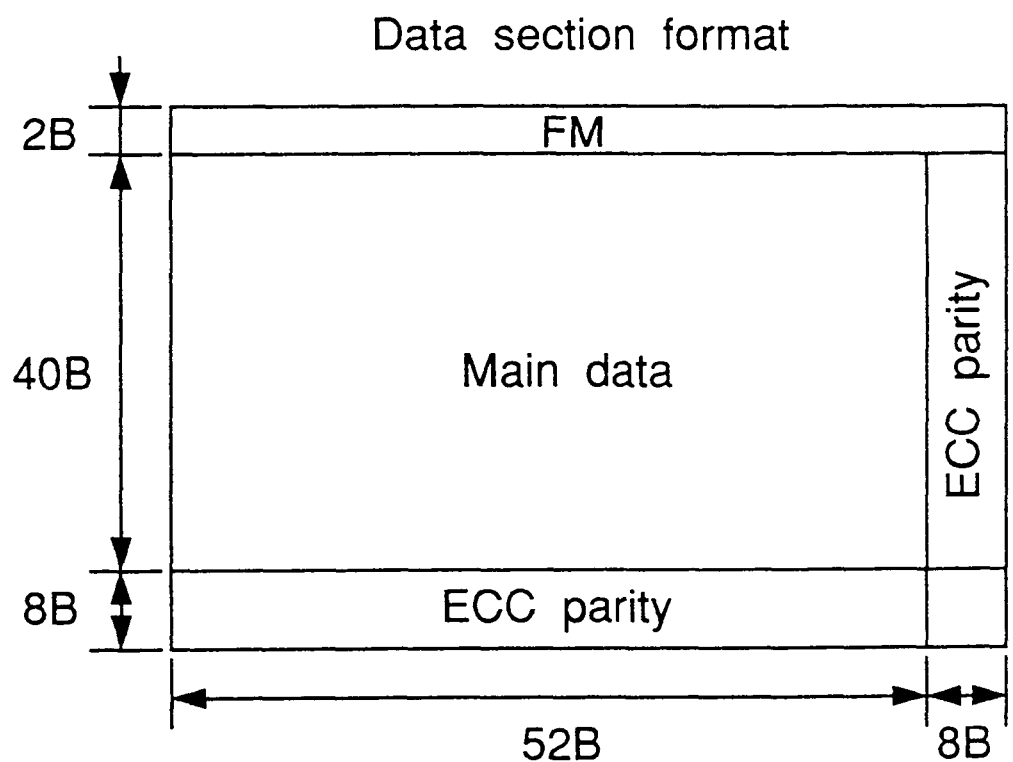
FIG. 3 is a format of a data section in each sector recorded by a data recording apparatus according to the first embodiment of the present invention.

The data unit frame is formatted vertically, as shown in FIG. 3, with one frame comprising 48 bytes of data. Frames 3 to 54 each comprise a main data block of 40 bytes and an 8 byte error correction parity block, while frames 55 to 62 comprise 48 bytes of ECC parity data. Note, however, that it is not necessary for each frame to contain 48 bytes of data, but it is necessary for the ID section and the data section to be composed of equally sized frames arranged at the same constant cycle.

It is to be further noted that while there are 62 frames per sector in the embodiment described above, the invention shall not be so limited and a different number of frames can be used.

In addition, the frame marks are preferably composed of a pattern of only zeros or only ones that is not found in the ID section or the data section, or a specific pattern of zeros or ones.

Figure 4:
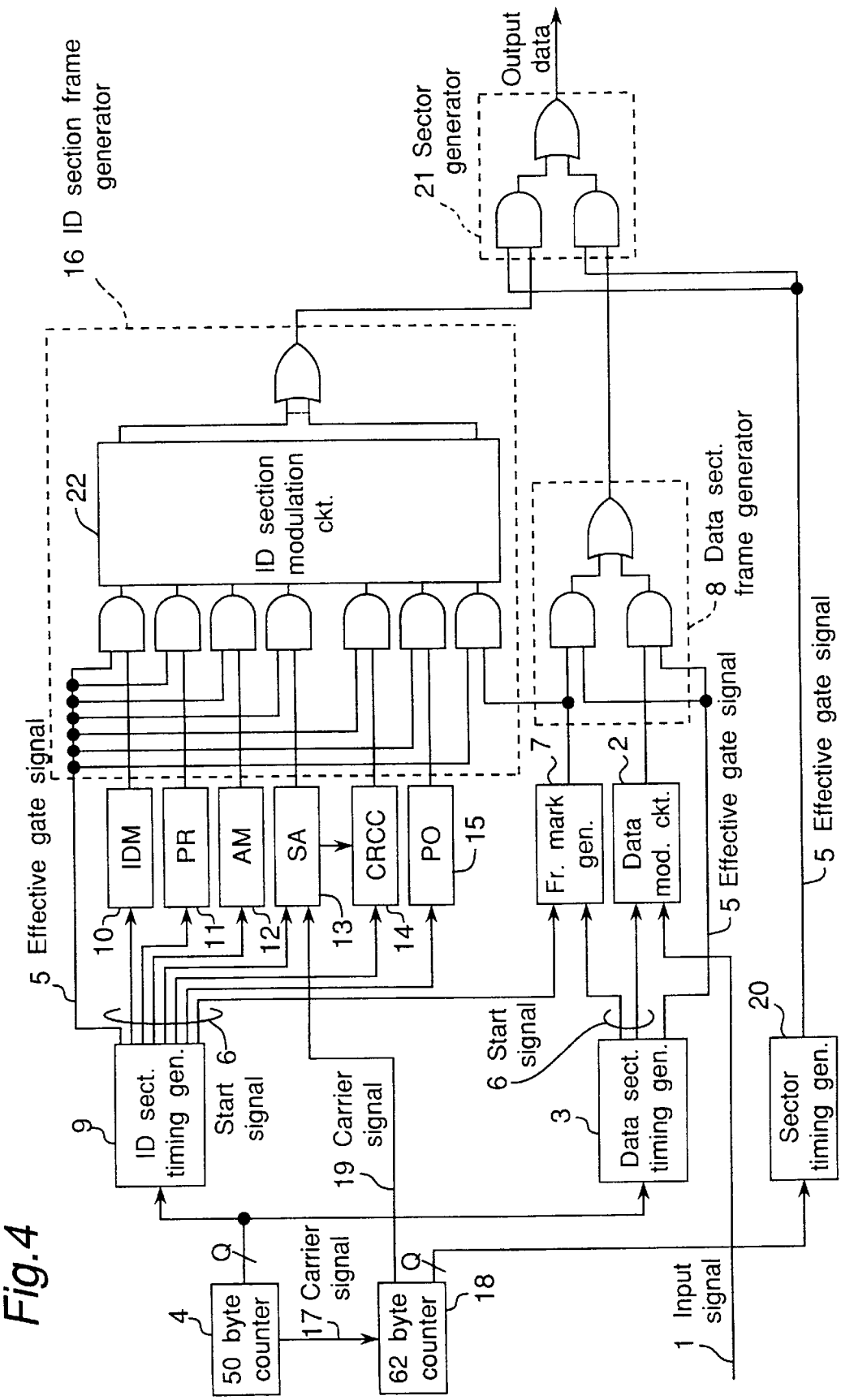
FIG. 4 is a block diagram of a data recording apparatus according to the second embodiment of the present invention.

As a second embodiment of the invention, a data recording apparatus applying a different modulation method for the ID section and the data section is described below with reference to FIG. 4.

The data recording apparatus of the second embodiment is essentially the data recording apparatus of the first embodiment with the addition of an ID section modulation circuit 22. This ID unit modulation circuit 22 modulates components of the ID section after multiplexing by the ID section frame generator 16, but does not multiplex the frame marks. Note that the modulation method applied by an ID section modulation circuit 22 is different from that applied by the data modulation circuit 2. The operation of the other circuit components is the same as described above in the first embodiment.

Note also that because the IDM is a mark indicating that the following data is the ID section, it is also possible to not modulate the IDM. In this case, a pattern that will not result from ID section modulation is used for the IDM to make IDM detection easier.

By thus using different modulation methods for the data section and the ID section, modulation achieving a high recording density can be used for the data section to increase the storage capacity of the recording medium, and modulation with a small maximum inversion interval and strong resistance to time-base variations in the reproduced signal can be used for the ID section. As a result, a data reproducing apparatus capable of reading the ID data with high reliability from high density recordings can be provided.

The operation of a data reproducing apparatus provided as the third embodiment of the invention is described below with reference to FIG. 5.

In this data reproducing apparatus, the data recorded to a recording medium 23 written with the sector format shown in FIG. 2 is reproduced from the recording medium 23 and input to a reproduction processor 24. The reproduction processor 24 amplifies the signal by means of a preamplifier circuit or other means, and outputs the amplified signal to PLL 25. The PLL 25 generates a clock synchronized to the reproduction signal, and inputs this clock with the reproduction signal to a FM detection circuit 26. The FM detection circuit 26 is comprised of a shift register 36 and comparator 37. The reproduction signal input from the PLL 25 is converted into a parallel signal by the shift register 36 and compared with a predetermined FM pattern by the comparator 37. If the converted parallel signal coincides with the predetermined FM pattern, an FM detection signal is output from the comparator 37.

On the other hand, an FM substitution signal generator 27 provides with a counter 38 for counting clock signals output from PLL 25 which is reset by the FM detection signal output from the comparator 37 as a CLR signal. The FM substitution signal generator 27 generates an FM substitution signal by a pulse generator 39, while counting clock signals by the counter 38, when the next frame mark is not detected at a timing that it is to be detected and, at the same timing, outputs the FM substitution signal through an OR circuit 40. Thus, either an FM detection signal or an FM substitution signal is input to a data demodulator 28 at a constant period. The data demodulator performs data modulation in frame units in synchronization with FM signals and outputs demodulated data.

Figure 12:
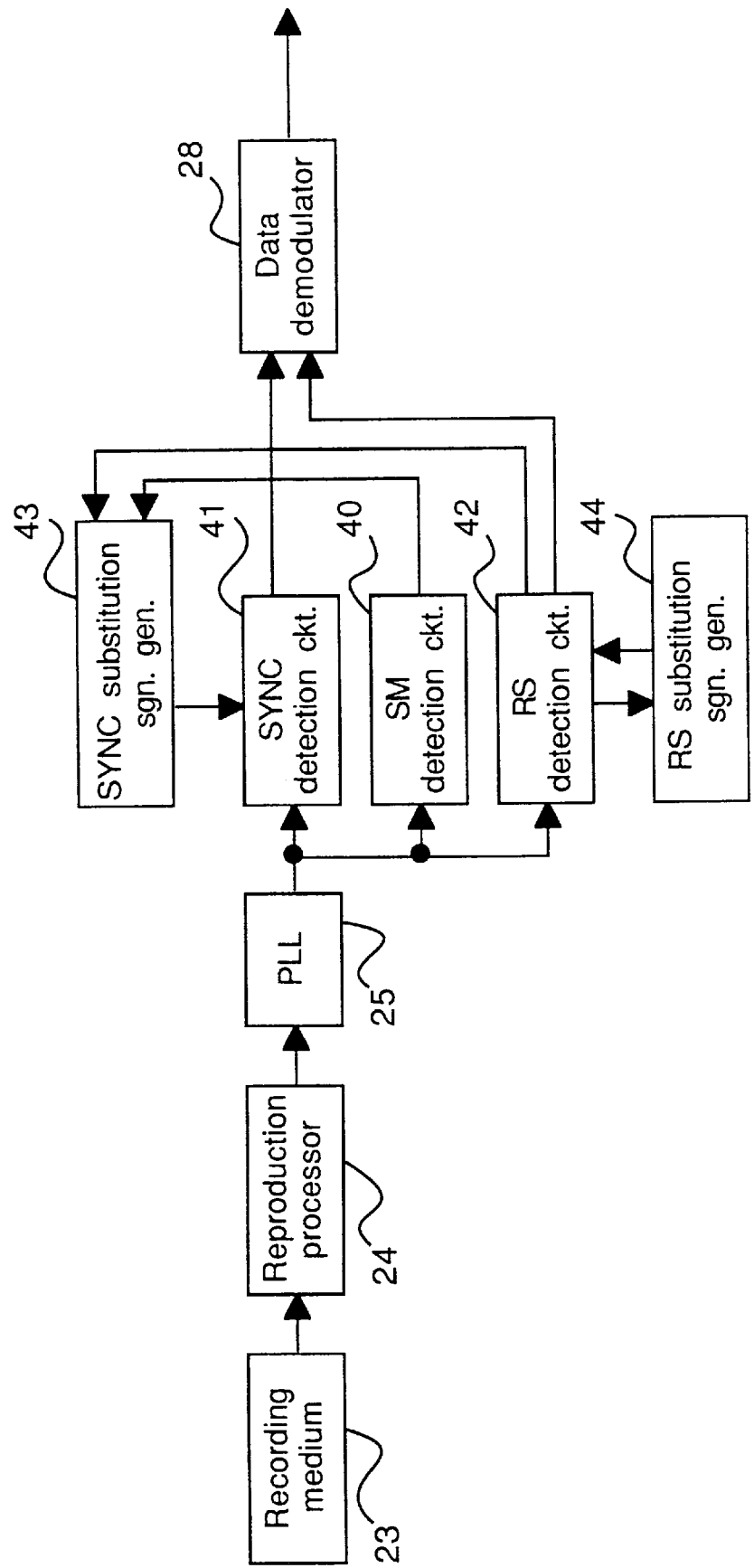
FIG. 12 is a block diagram of a conventional information reproducing apparatus.
Figure 13:
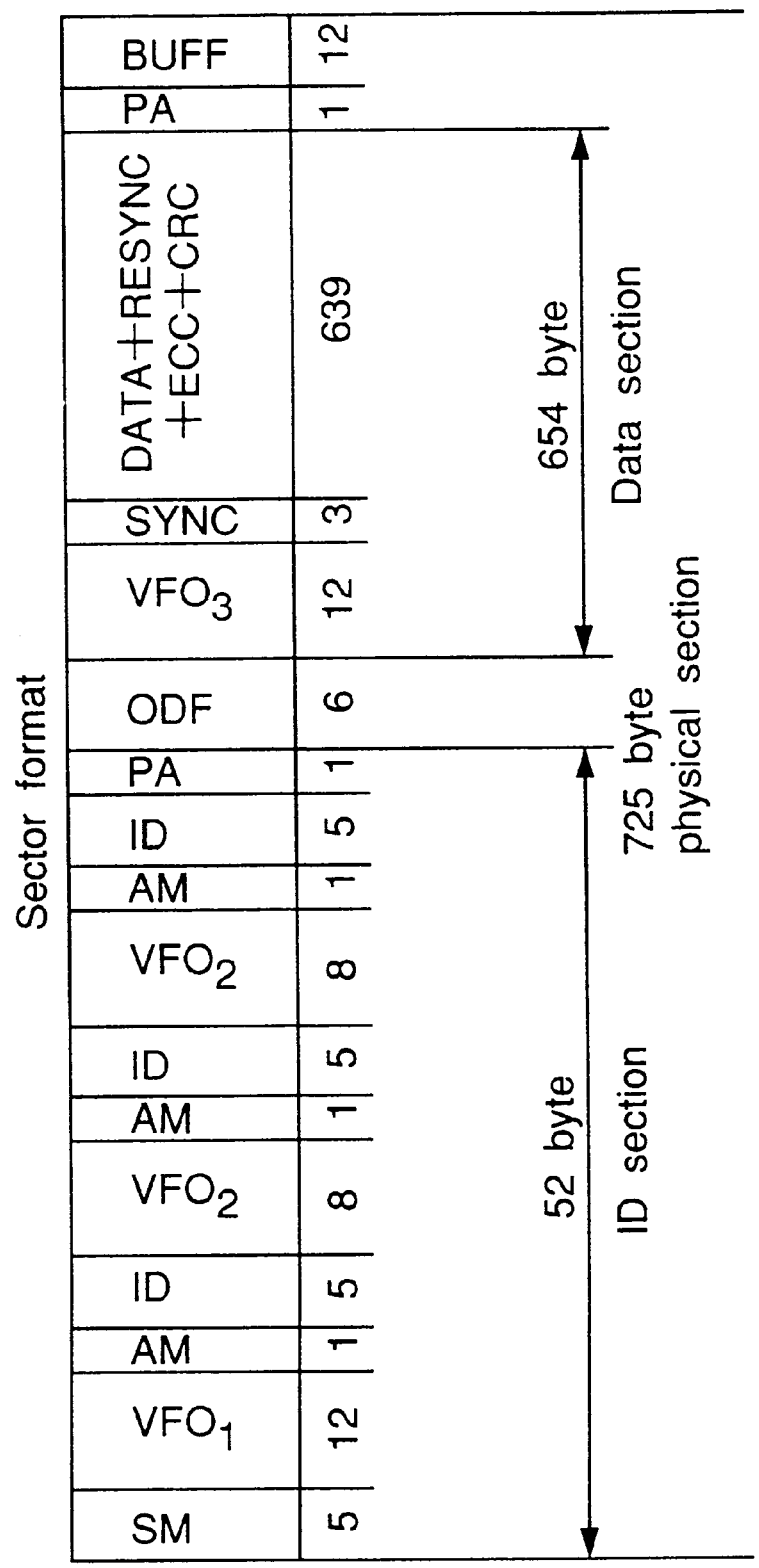
FIG. 13 is a sector format employed in a conventional data recording apparatus.
Figure 14:
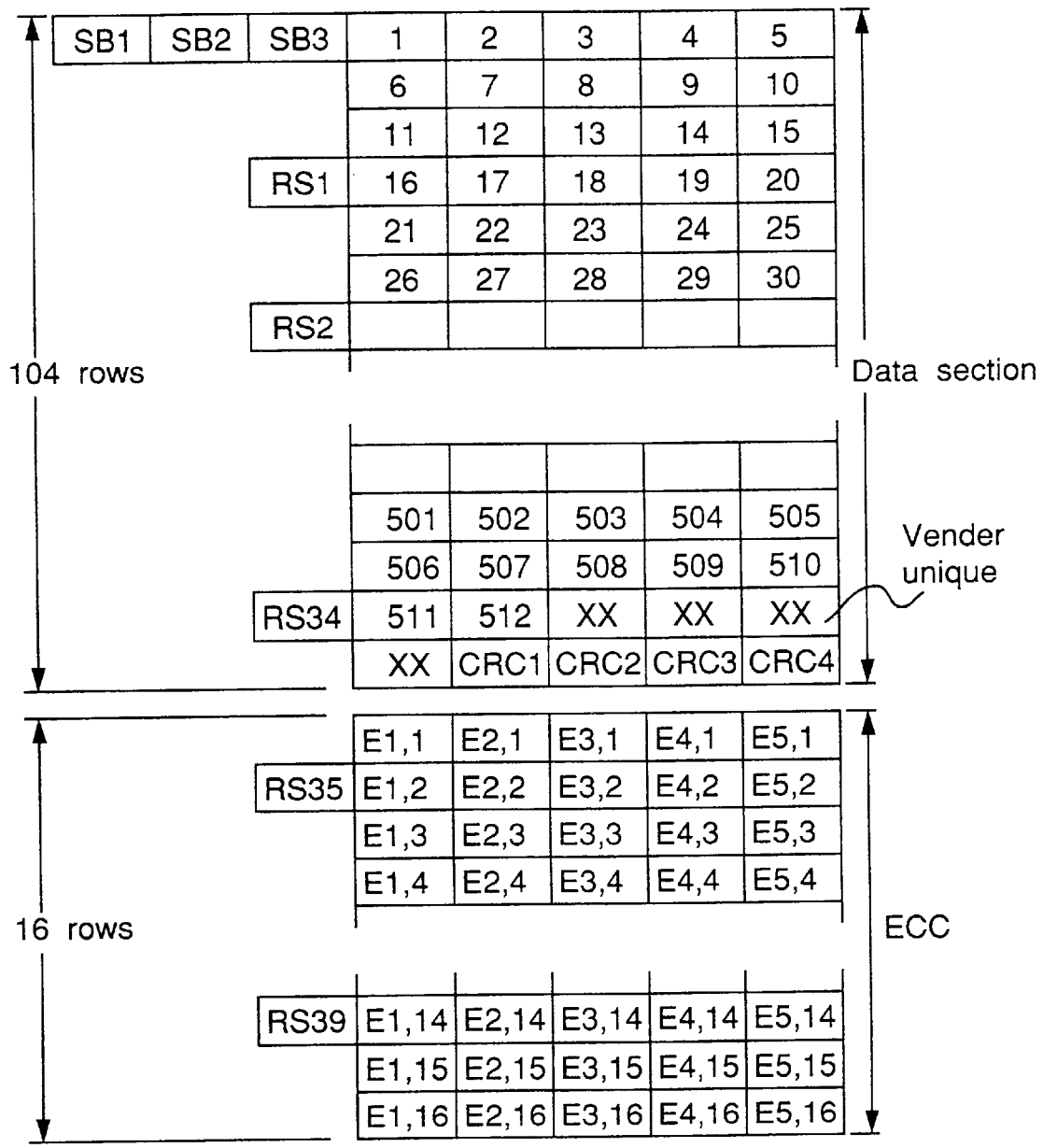
FIG. 14 is a format of a data section employed in a conventional data recording apparatus.
Figure 7:
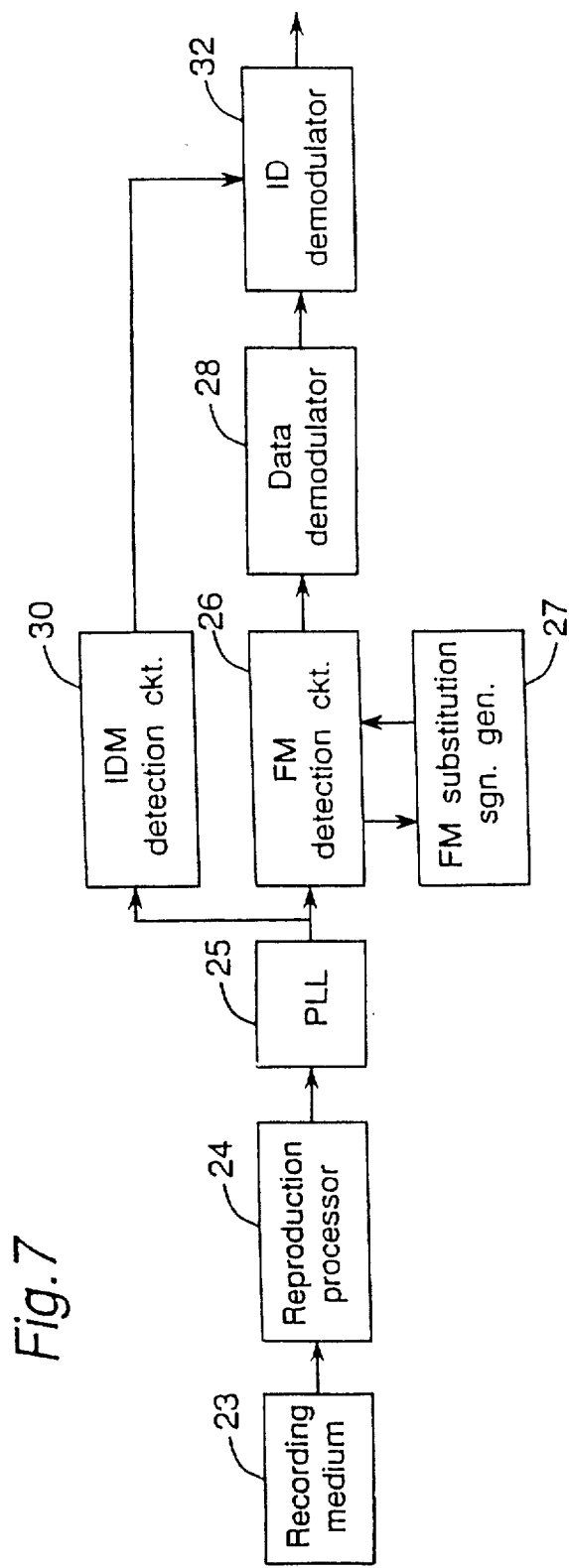
Figure 8:
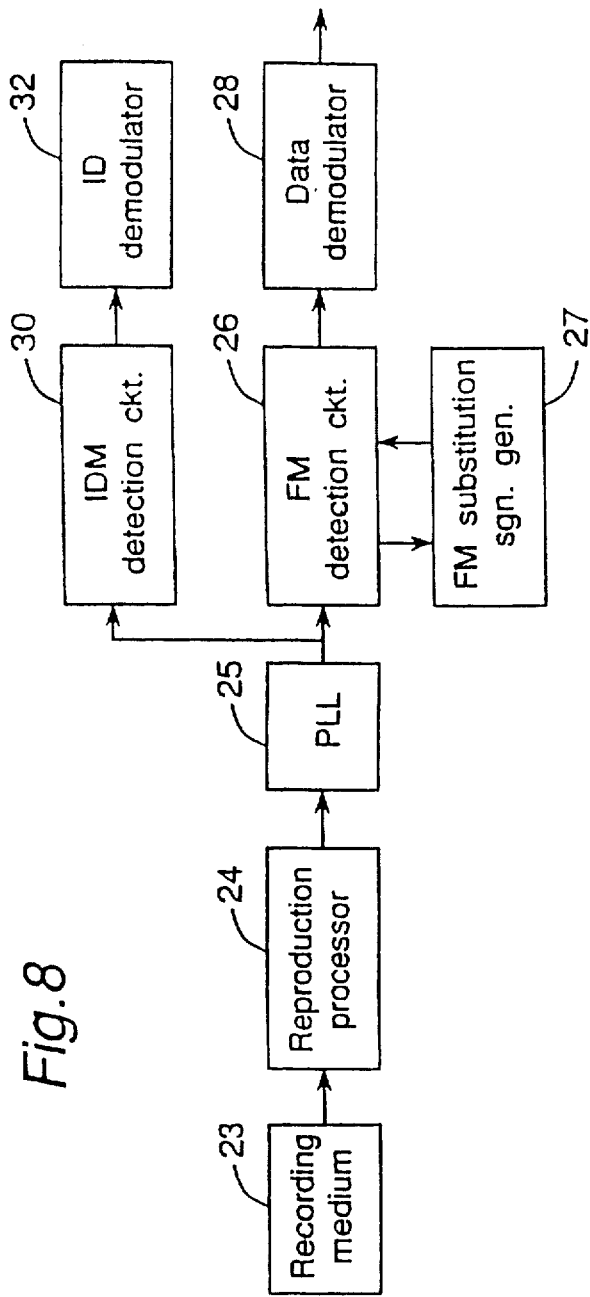
Figure 9:
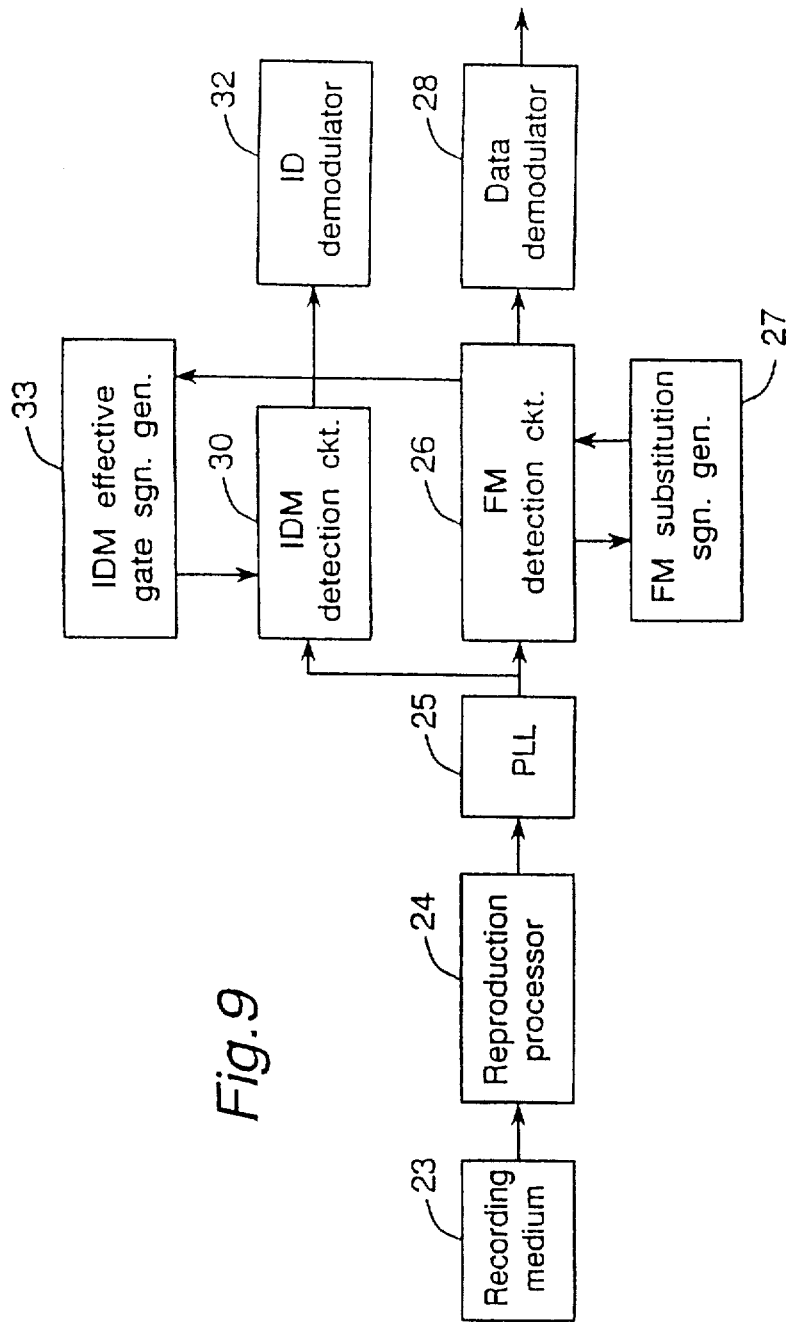
Figure 10:
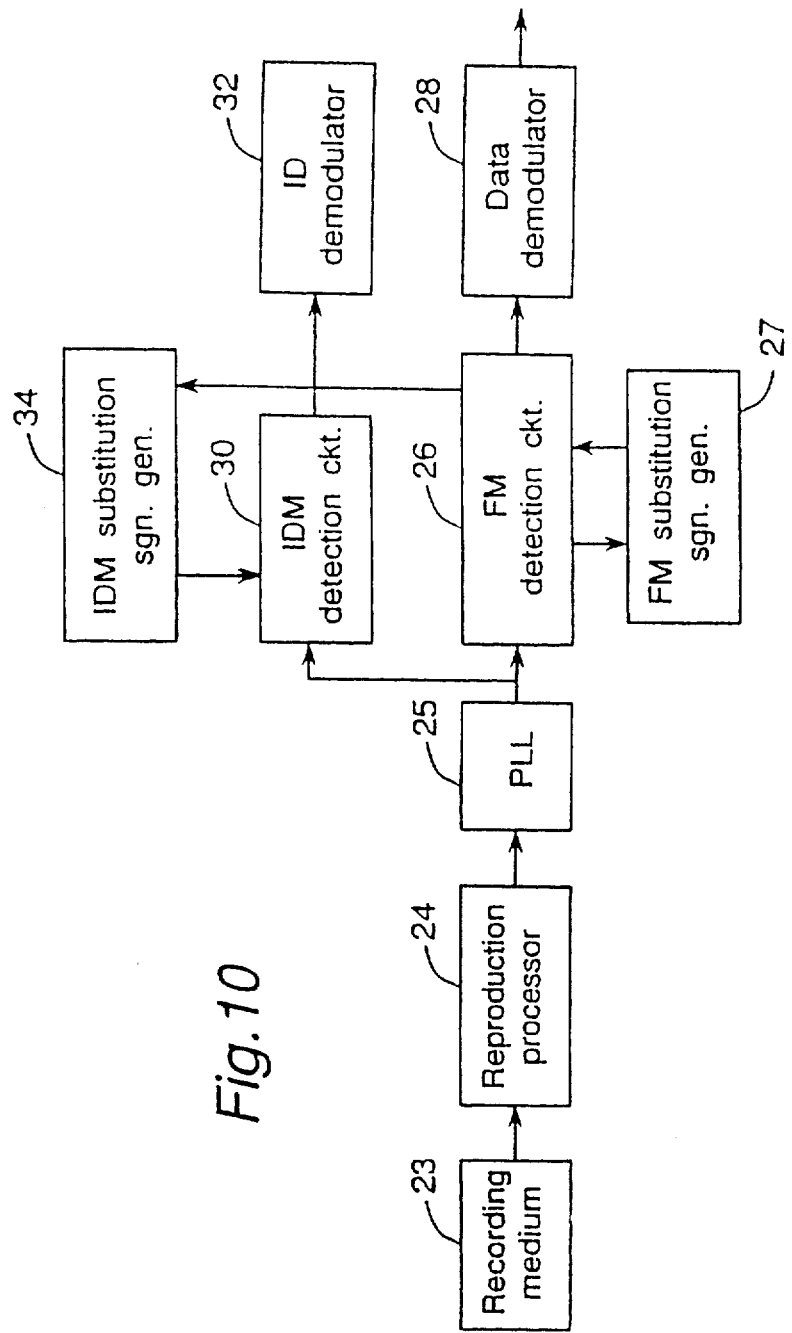
Figure 11:
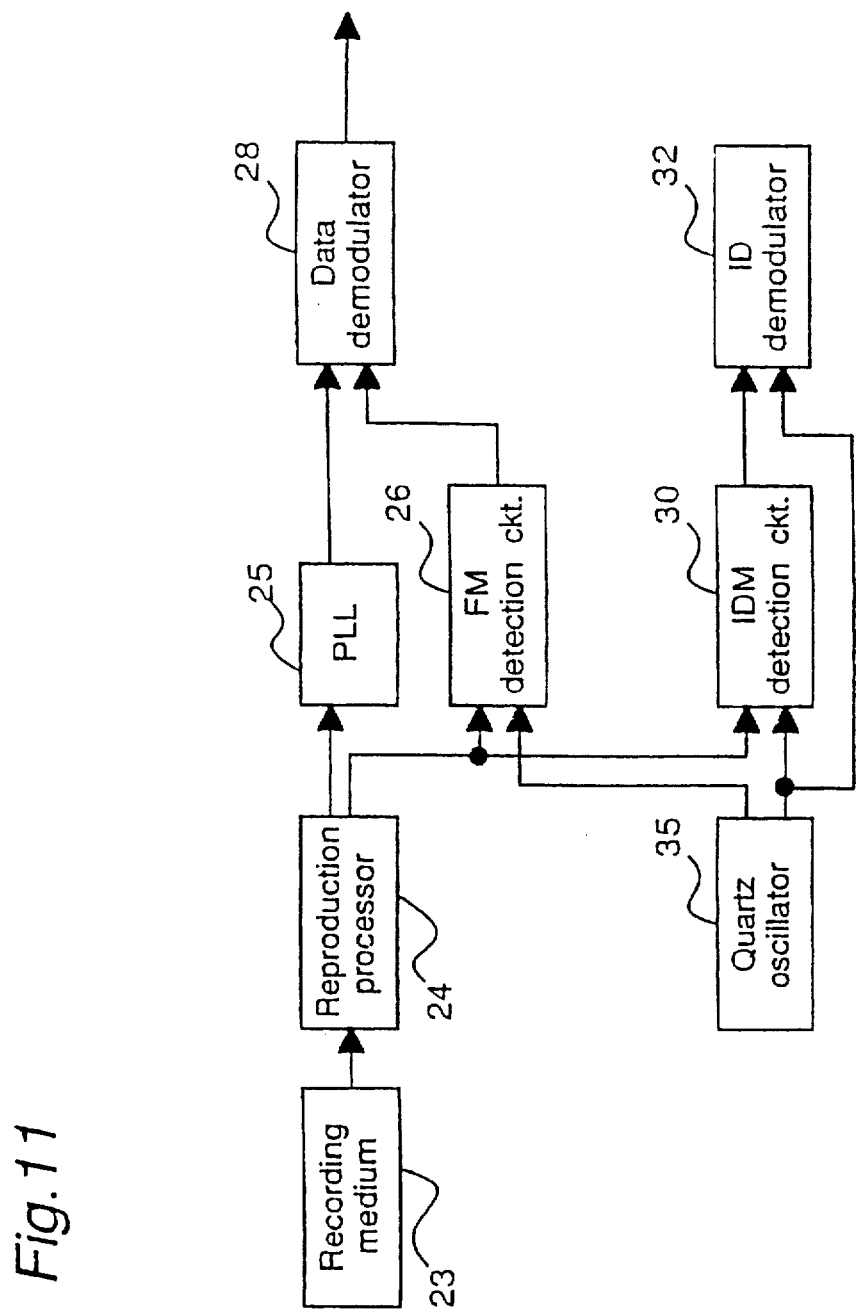

In the conventional format shown in FIG. 14, the SYNC and RS marks (equivalent to the frame marks (FM) in the present invention) indicating the beginning of the frame are discontinuous in the ID section. As shown in FIG. 12, it is therefore necessary to provide an SM detection circuit 40, SYNC detection circuit 41, and RS detection circuit 42 to detect the respective marks during data reproduction, and separately provide a SYNC substitution signal generator 43 and an RS substitution signal generator 44. The SYNC substitution signal generator 43 generates a substitution signal based on the SM or the SYNC mark in the previous sector when the SYNC mark is not detected, and the RS substitution signal generator 44 generates another substitution signal when the RS mark is not detected.

In the data reproducing apparatus according to the present embodiment of the invention, however, the frame marks can be detected at a regular cycle during data reproduction, and it is therefore easy to generate a substitution signal from the immediately preceding frame mark when a frame mark is not detected.

In addition, the non-uniform spacing of the RS marks in the conventional sector format requires a control method for substitution signal generation whereby the substitution signal is generated according to the position of the RS mark in the sector, i.e., after the last RS mark in one sector, the substitution signal is generated relative to the SYNC mark of the next sector, but is otherwise generated relative to the next RS mark in the same sector. The problem with this method is that when an RS mark is falsely detected in the data, a substitution signal is inserted to a position where there should be no synchronization mark, and data demodulation errors result.

With the data reproducing apparatus of the present embodiment, however, the constant regular positioning of the frame marks means that the substitution signals will not be output to a wrong position, data demodulation errors are thereby prevented, and high reliability data reproduction is made possible. This format also enables the data reproducing apparatus to be built with a simpler circuit configuration than the prior art because it is only necessary to provide one synchronization mark detector (FM detection circuit 26) and one substitution signal generator (frame mark substitution signal generator 27).

Figure 6:
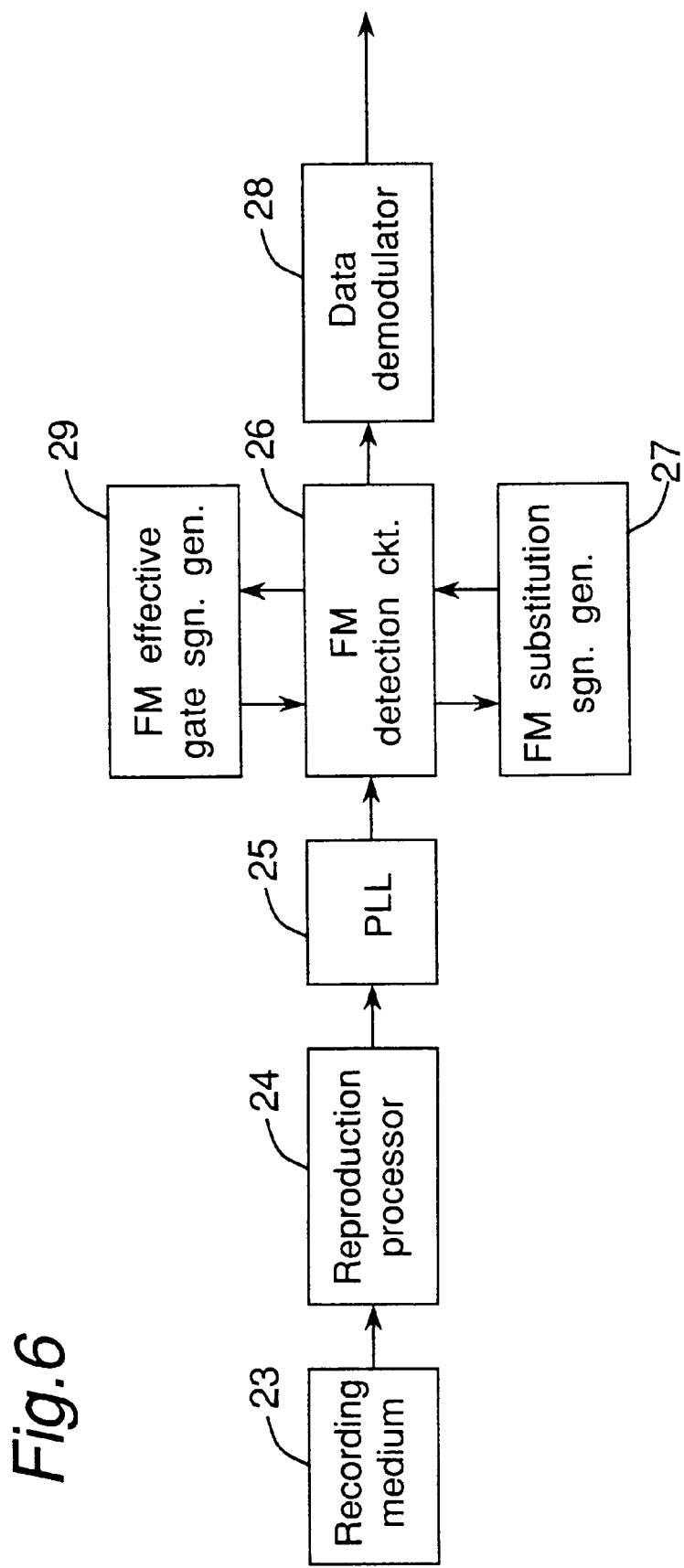
FIG. 6 is a block diagram of a data reproducing apparatus according to the fourth embodiment of the present invention.

The fourth embodiment of the invention is a data reproducing apparatus comprising both an effective frame mark gate generator 29 for opening a gate for the next frame mark from a detected frame mark, and a circuit for generating a substitution signal when the frame mark is not detected. A block diagram of this data reproducing apparatus is shown in FIG. 6.

An effective frame mark gate signal generator 29 counts the clock output from the PLL 25 based on the frame marks detected by the FM detection circuit 26, and opens an effective frame mark gate with a width of several clock counts before and after the position at which the next frame mark should be detected. Frame marks detected by the FM detection circuit 26 while this gate is closed are considered to be detection errors, and are therefore deleted.

The other components of this embodiment operate the same as those of the third embodiment described above, and further description is omitted below.

By thus generating an effective gate for the frame marks, false frame mark detection is prevented and more reliable data demodulation can be achieved.

Figure 7:
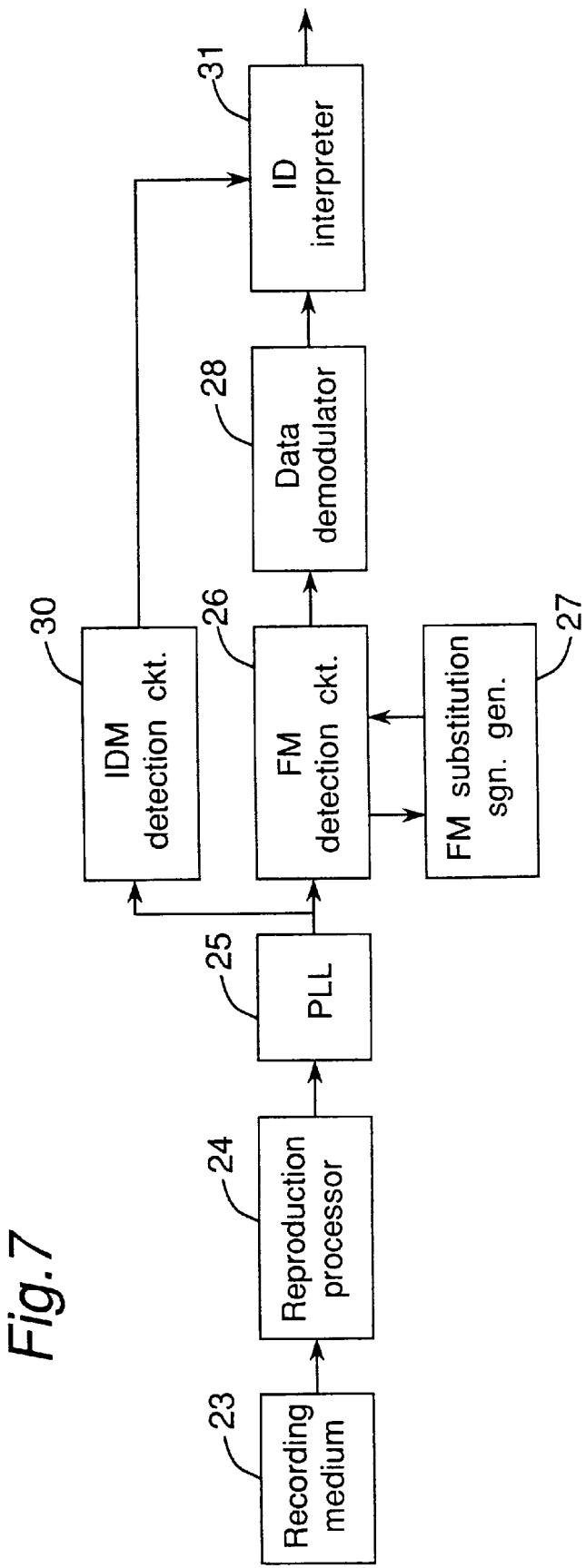
FIG. 7 is a block diagram of a data reproducing apparatus according to the fifth embodiment of the present invention.

The fifth embodiment of the invention is a data reproducing apparatus according to the third embodiment further comprising an IDM detection circuit 30 and an ID demodulator 32. A block diagram of this data reproducing apparatus is shown in FIG. 7.

The IDM detection circuit 30 of this embodiment detects the IDM from the reproduction signal, and outputs the detected IDM to the ID demodulator 32. The ID interpreter 31 then reads the ID based on the IDM.

The other components of this embodiment operate the same as those in the data reproducing apparatus of the third embodiment described above, and further description is omitted below.

By thus adding an IDM detection circuit 30, those frames to which the ID is recorded can be more dependably detected, and the IDs can therefore be read more reliably.

The sixth embodiment of the invention is a data reproducing apparatus for reproducing data recorded to the recording medium with the ID section and the data section modulated using different modulation methods. A block diagram of this data reproducing apparatus is shown in FIG. 8.

Figure 5:
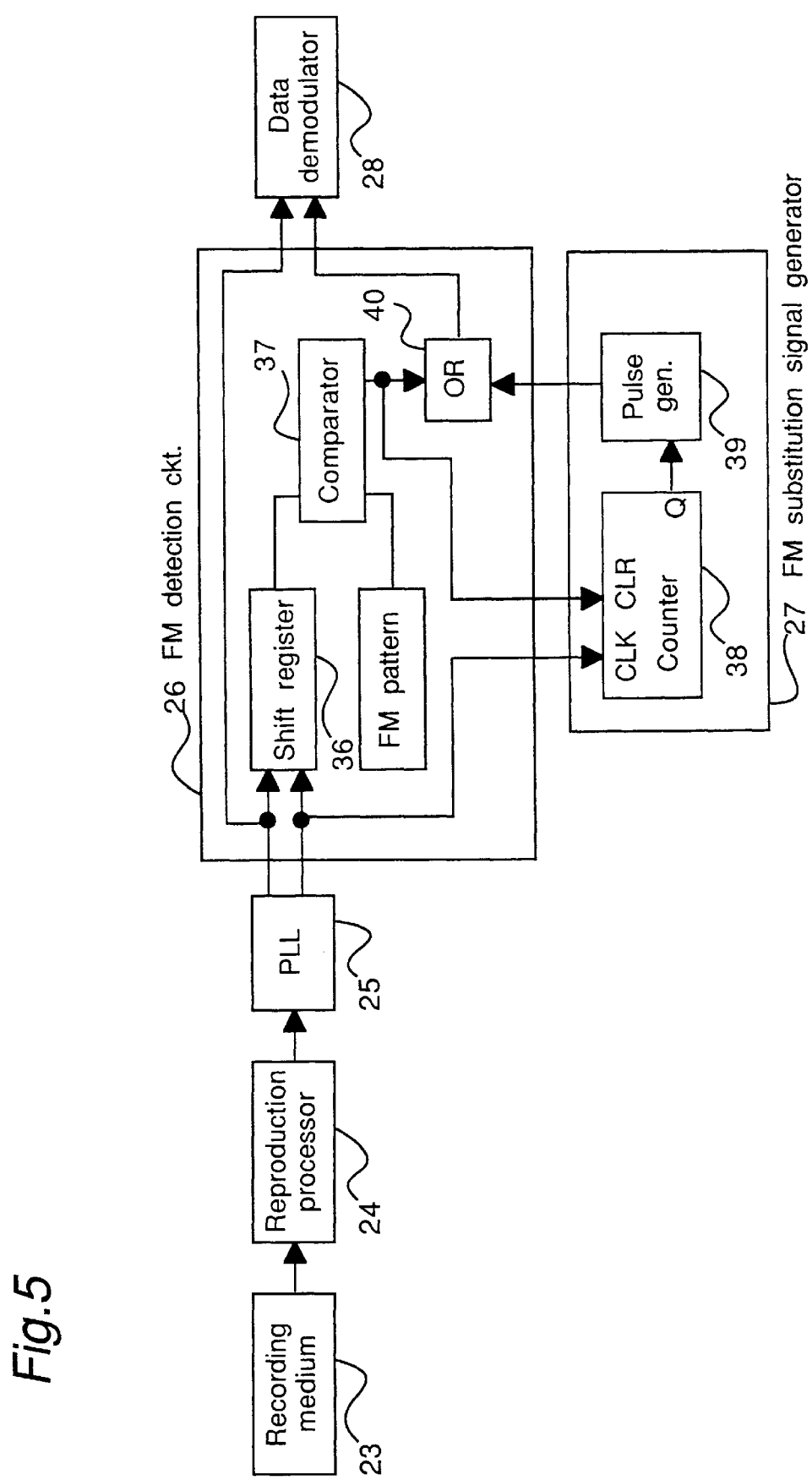
FIG. 5 is a block diagram of a data reproducing apparatus according to the third embodiment of the present invention.

This embodiment is similar to the third embodiment shown in FIG. 5 with the addition of an IDM detection circuit 30, demodulator 32, and ID demodulator 32. The IDM detection circuit 30 detects the IDM from the reproduction signal, and outputs the detected IDM. to the ID demodulator 32 for demodulation of the ID based on this IDM. The demodulated ID data is then input to the ID interpreter 31, which then reads the ID based on the IDM.

The other components of this embodiment operate the same as those of the third embodiment described above, and further description is omitted below.

Figure 8:
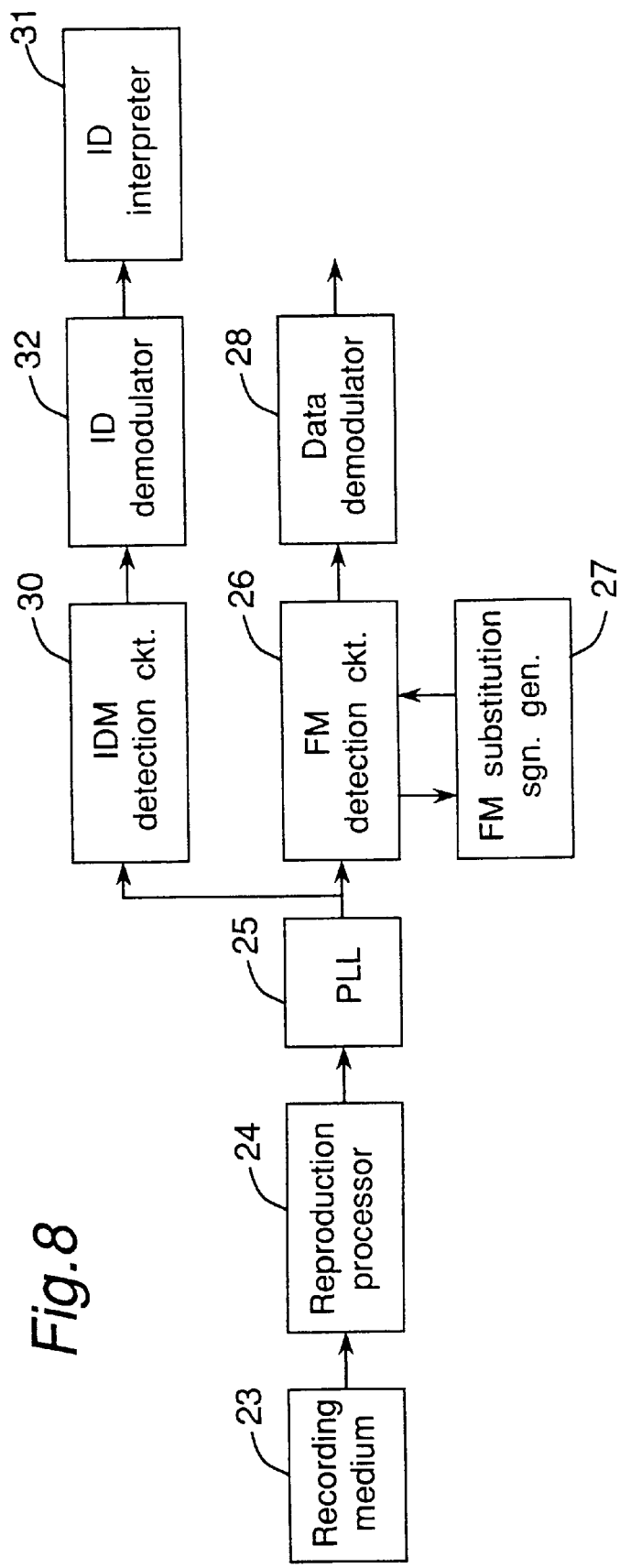
FIG. 8 is a block diagram of a data reproducing apparatus according to the sixth embodiment of the present invention.

It is to be noted that while only one PLL 25 is shown in FIG. 8, this data reproducing apparatus may be alternatively configured with separate PLLs for the ID and data units.

Figure 9:
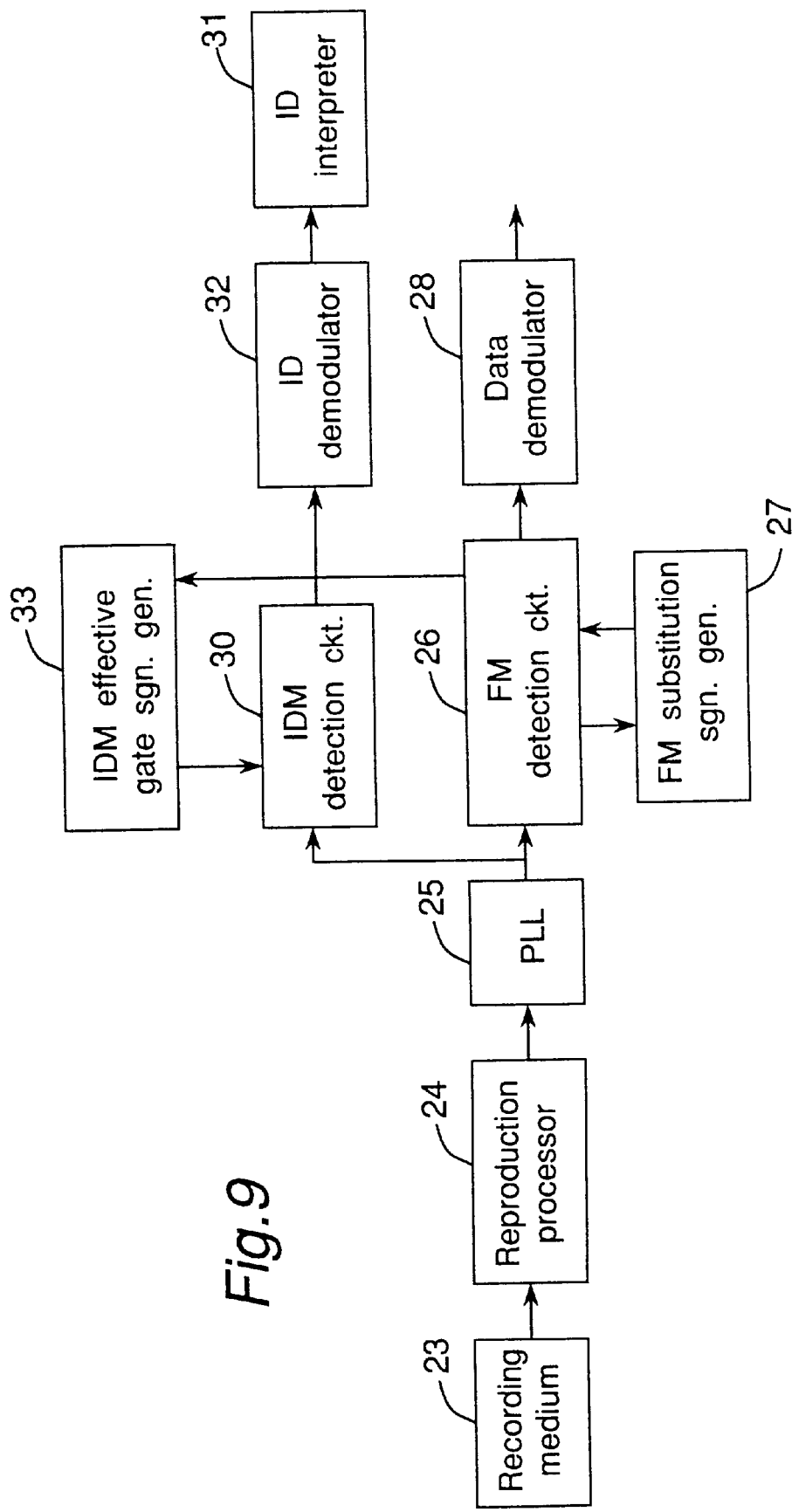
FIG. 9 is a block diagram of a data reproducing apparatus according to the seventh embodiment of the present invention.

The seventh embodiment of the invention is a data reproducing apparatus for reproducing data from a recording medium recorded with ID marks (IDM) positioned in the sectors, and is similar to the sixth embodiment described above with the addition of an effective IDM gate generator 33. A block diagram of this data reproducing apparatus is shown in FIG. 9.

The effective IDM gate generator 33 counts the clock output from the PLL 25 based on the frame marks detected by the FM detection circuit 26, and opens an effective IDM gate with a width of several clock counts before and after the position at which the IDM should be detected. IDMs detected by the IDM detection circuit 30 while this gate is closed are considered to be detection errors, and are therefore deleted.

The other components of this embodiment operate the same as those of the sixth embodiment described above, and further description is omitted below.

IDM detection errors can thus be reduced by opening an effective IDM gate based on the frame marks. Because the frame marks on which IDM gate generation is based occur at a regular cycle, the ID marks can be detected with extremely high precision if the frame mark substitution signal generator 27 is provided, and the IDM gates can also be accurately generated.

Figure 10:
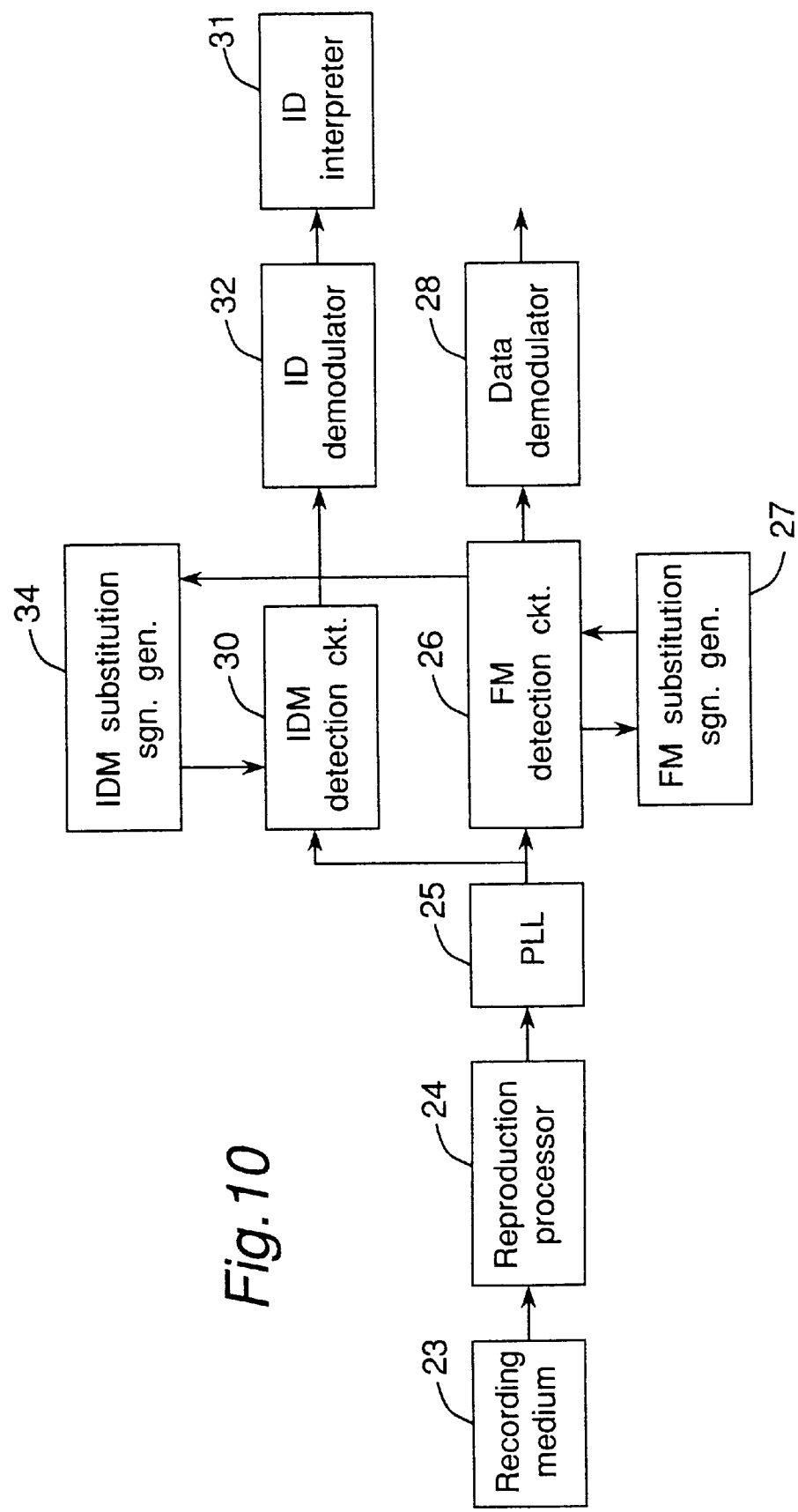
FIG. 10 is a block diagram of a data reproducing apparatus according to the eighth embodiment of the present invention.

A data reproducing apparatus for generating an IDM substitution signal is described next as the eighth embodiment of the invention. A block diagram of this data reproducing apparatus is shown in FIG. 10.

The IDM substitution signal generator 34 in this embodiment counts the clock output from the PLL 25 based on the frame marks detected by the FM detection circuit 26, and generates a substitution signal at the position where the IDM should be detected when the IDM is not detected. By thus interpolating the ID marks, the ID can be interpreted even if the IDM unit cannot be correctly reproduced.

The other components of this embodiment operate the same as those in the data reproducing apparatus of the seventh embodiment described above, and further description is omitted below.

Figure 11:
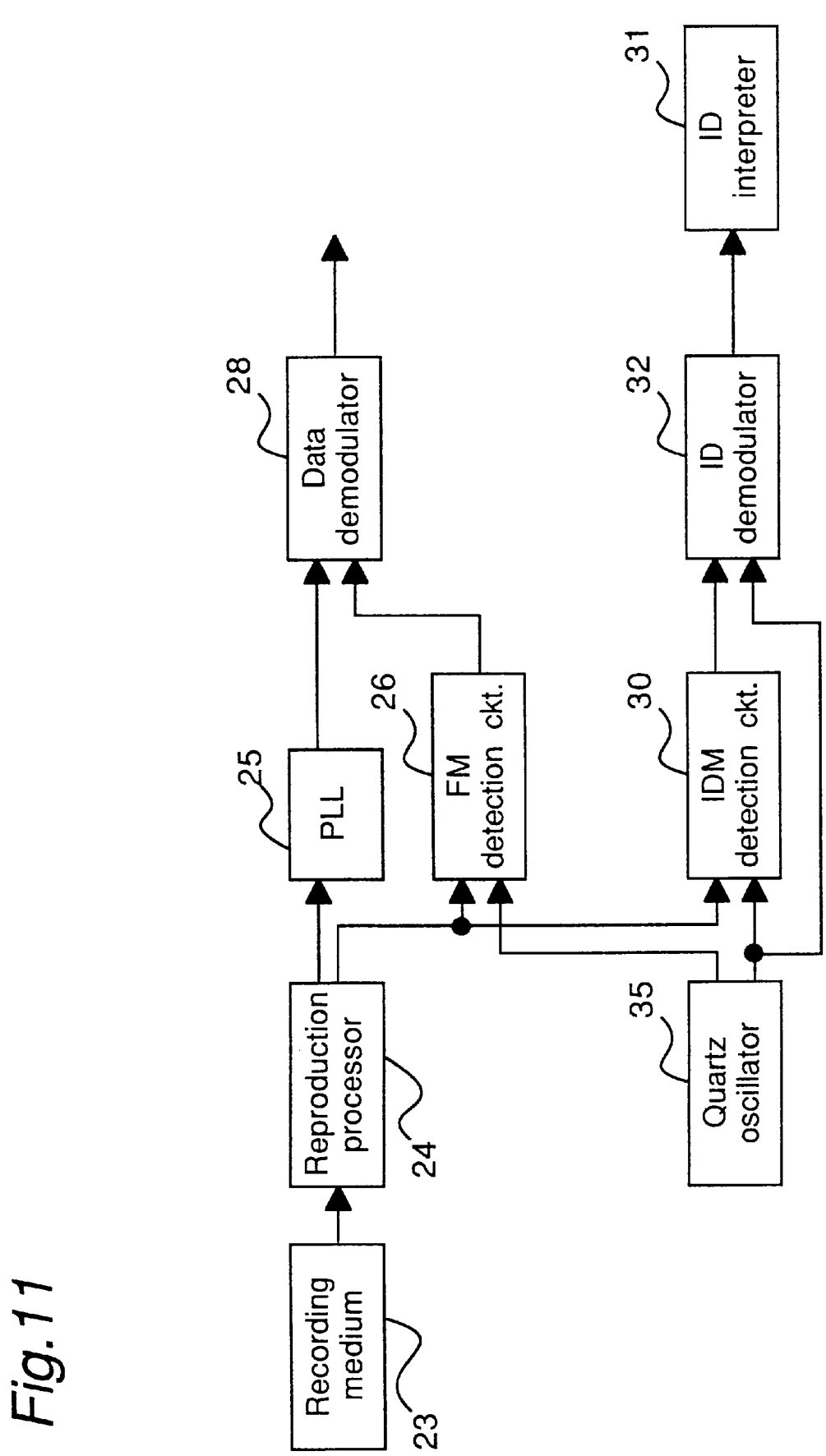
FIG. 11 is a block diagram of a data reproducing apparatus according to the ninth embodiment of the present invention.

The data reproducing apparatus according to the ninth embodiment of the invention operates the FM detection circuit 26 and IDM detection circuit 30 without using a clock synchronized to the reproduction signal, and is described below with reference to the block diagram shown in FIG. 11.

It is assumed in the following description that (1,7) RLL modulation is applied to the data unit, and phase encoding modulation is applied to the ID unit.

When (1,7) RLL modulation is applied and data is recorded with pulse width modulation, there are seven inversion intervals in the reproduced wave from 2T to 8T where T is the period of the channel clock of (1,7) RLL modulation. On the other hand, there are only two inversion intervals in the reproduced wave with phase encoding modulation, and these intervals are therefore assigned to 3T and 6T. An 11T pattern that does not exist in both the ID unit and the data unit is embedded to the frame mark, and a continuous pattern of 12T, 12T is embedded to the IDM.

When reproducing data recorded with these patterns, the signal reproduced from the recording medium 23 is first input to the reproduction processor 24 for amplification prior to being input to the FM detection circuit 26 and the IDM detection circuit 30. Both of these detectors operate at a clock generated by a quartz oscillator 35 rather than a clock synchronized to the reproduction signal. This is because the frame marks can be detected if the patterns from 10T to 12T can be detected because the 11T pattern of the frame mark is not present in both the ID unit and the data unit. The IDM can also be detected in the same way.

The detected frame marks and ID marks are then input to the data demodulation circuit 28 and ID demodulator 32, respectively. The data demodulation circuit 28 operates at a clock synchronized to the reproduction signal output from the PLL 25, but the ID demodulator 32 operates using the clock from the quartz oscillator 35. This is because there are only the two inversion intervals at 3T and 6T in the phase encoding modulated signal, and the signal can be demodulated using the 3T pattern from 2T to 4T and using the 6T pattern from 5T to 7T.

By thus using a pattern that is not used in both the data unit and the ID unit in the ID marks and frame marks, the marks can be detected before the PLL locks at jump and seek operations, the ID can be quickly read referenced to these marks, and the seek time can be shortened.

It is to be noted that (1,7) RLL modulation and phase encoding modulation have been used in the above embodiment by way of example only, and it will be obvious that the invention is not limited to these modulation methods.

In addition, while the above embodiment is described using different modulation methods in the ID unit and the data unit, it will also be obvious that the same modulation method can be used in both the ID and data units.

Furthermore, while the present invention has been described above with the data recording apparatus and data reproducing apparatus as discrete devices, the data recording apparatus and the data reproducing apparatus can also be combined in a single apparatus.

Finally, it will be obvious that plural components described separately in the above first through ninth embodiments can be combined in various ways in apparatuses achieving the same function.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

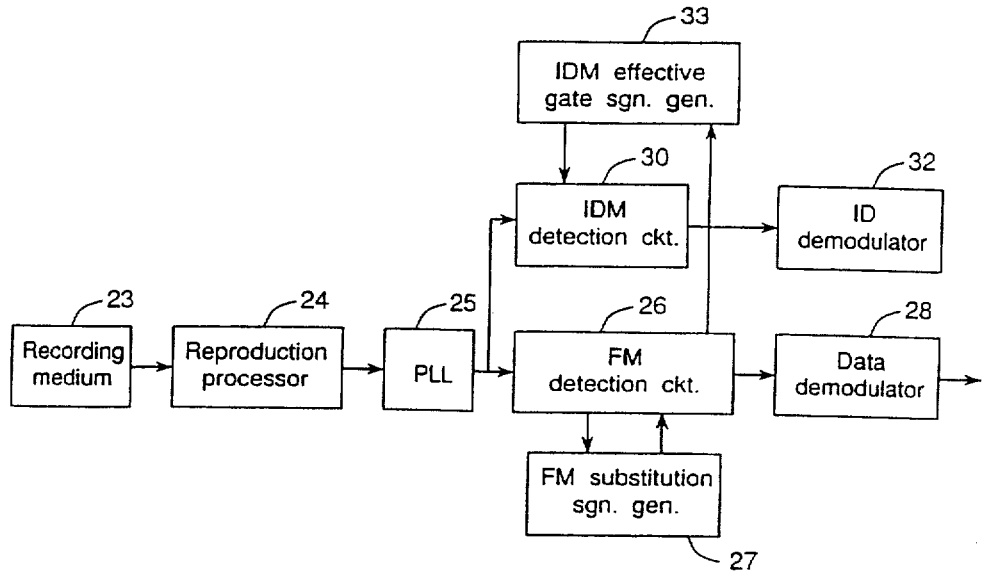

What is claimed is:

1. Information reproducing apparatus for obtaining a reproduction signal from information recorded on a recording medium formatted in sector units each consisting of an ID section for identifying a physical position of each sector on the recording medium and a data section consisting of data to be reproduced, comprising:

a reproduction processor for reading out the information recorded on the recording medium and outputting the information as a reproduction signal after amplifying it;

a clock signal generator for generating clock signals in synchronization with the reproduction signal;

frame mark detection means for detecting frame marks from the reproduction signal, said each frame mark having a specific pattern distinguishable from other patterns contained in the reproduction signal;

data demodulation means for demodulating data contained in the reproduction signal based on the detected frame marks by using the clock signals generated by said clock signal generator;

ID mark detection means for detecting ID marks, with reference to the detected frame marks, each being arranged at a head position of each ID section to identify it; and an ID demodulator for demodulating each ID section identified based on the ID mark detected by said ID mark detection means.

2. Information reproducing apparatus as claimed in claim 1, in which data of the ID section has been modulated by a modulation method different from the modulation method used to modulate data in the data section.

3. Information reproducing apparatus as claimed in claim 2, further comprising an effective gate signal generation means for generating an effective gate signal based on a latest ID mark to determine whether or not the presently detected frame mark is true.

4. Information reproducing apparatus as claimed in claim 2, further comprising a ID mark substitution signal generation means for generating a ID mark substitution signal based on a latest frame mark when a next ID mark is not detected at a predetermined timing from the detection timing of the latest frame mark.

5. Information reproducing apparatus as claimed in claim 2, wherein said ID mark detection means detects each ID mark independently from the clock signal generated by said clock signal generation means.

6. Information reproducing apparatus as claimed in claim 1, further comprising an effective gate signal generation means for generating an effective gate signal based on a latest ID mark to determine whether or not the presently detected frame mark is true.

7. Information reproducing apparatus as claimed in claim 1, further comprising a ID mark substitution signal generation means for generating a ID mark substitution signal based on a latest frame mark when a next ID mark is not detected at a predetermined timing from the detection timing of the latest frame mark.

8. Information reproducing apparatus as claimed in claim 1, wherein said ID mark detection means detects each ID mark independently from the clock signal generated by said clock signal generation means.

* * * * *

UNITED STATES PATENT AND TRADEMARK OFFICE
CERTIFICATE OF CORRECTION

PATENT : 5,905,704

DATED : May 18, 1999

INVENTOR(S) : Satoshi Kato, et al.

It is certified that error appears in the above-identified patent and that said Letters Patent is hereby corrected as shown below:

The title page, showing the illustrative figure, should be deleted and substitute therefor the attached title page.

In the Drawings:
Delete Figs. 7-11 and substitute therefor Figs. 7-11, as shown on the attached pages.

Signed and Sealed this

Eighth Day of February, 2000

Attest:

Q. TODD DICKINSON

Attesting Officer

Commissioner of Patents and Trademarks

United States Patent [19]
Kato et al.

[11] Patent Number: 5,905,704
[45] Date of Patent: May 18, 1999

[54] DATA REPRODUCING APPARATUS FOR REPRODUCING DATA FROM SECTOR UNITS OF A RECORDING MEDIUM

[75] Inventors: Satoshi Kato, Hirakata; Akira Muto, Sakai, both of Japan

[73] Assignee: Matsushita Electric Industrial Co., Ltd., Osaka-fu, Japan

[21] Appl. No.: 08/751,890

[22] Filed: Nov. 18, 1996

Related U.S. Application Data

[62] Division of application No. 08/313,439, Sep. 27, 1994, Pat. No. 5,623,467.

[30] Foreign Application Priority Data

Sep. 27, 1993 [JP] Japan .................................. 5-239699
Sep. 27, 1993 [JP] Japan .................................. 5-239700

[51] Int. Cl.$^6$ .................................................. G11B 7/00
[52] U.S. Cl. ................................. 369/48; 369/47; 369/58
[58] Field of Search ............................... 369/47, 48, 50, 369/54, 58, 59, 124, 44.26; 360/48

[56] References Cited

U.S. PATENT DOCUMENTS

| | | |
|---|---|---|
| 4,418,368 | 11/1983 | Nalley et al. . |
| 4,523,304 | 6/1985 | Satoh et al. .................. 369/32 |
| 4,734,901 | 3/1988 | Murakami . |
| 4,805,046 | 2/1989 | Kuroki et al. . |
| 4,855,983 | 8/1989 | Arai . |
| 4,908,811 | 3/1990 | Yokogawa et al. . |
| 4,947,367 | 8/1990 | Chang et al. . |
| 5,034,939 | 7/1991 | Kurz et al. . |
| 5,054,017 | 10/1991 | Hiroyoshi et al. .................. 369/47 |
| 5,119,291 | 6/1992 | Flannagan et al. . |
| 5,153,861 | 10/1992 | Maeda et al. . |
| 5,359,584 | 10/1994 | Fukushima et al. . |

FOREIGN PATENT DOCUMENTS

| | | |
|---|---|---|
| 63-13171 | 1/1988 | Japan . |
| 63-13172 | 1/1988 | Japan . |
| 1-154382 | 6/1989 | Japan . |
| 3-71244 | 3/1991 | Japan . |
| 5-225709 | 9/1993 | Japan . |

*Primary Examiner*—Thang V. Tran
*Attorney, Agent, or Firm*—Ratner & Prestia

[57] ABSTRACT

When data is recorded to a recording medium having a sector structure, the data is recorded with synchronization signals (frame marks) placed at a constant interval for use during data reproduction. When the data is then reproduced from this recording medium, these frame marks are detected to demodulate the data based on the detected signals.

8 Claims, 14 Drawing Sheets